(12) United States Patent
Sakato et al.

(10) Patent No.: US 12,394,177 B2
(45) Date of Patent: Aug. 19, 2025

(54) IMAGE CAPTURING APPARATUS THAT SWITCHES IMAGE CAPTURING CONTROL ACCORDING TO CAPTURING SCENE, INFORMATION PROCESSING APPARATUS, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventors: Kazuma Sakato, Kanagawa (JP); Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 18/324,299

(22) Filed: May 26, 2023

(65) Prior Publication Data

US 2023/0394788 A1    Dec. 7, 2023

(30) Foreign Application Priority Data

Jun. 3, 2022    (JP) ................. 2022-091083

(51) Int. Cl.
*G06V 10/70* (2022.01)
*G06V 10/141* (2022.01)
(Continued)

(52) U.S. Cl.
CPC ............ *G06V 10/70* (2022.01); *G06V 10/141* (2022.01); *H04N 23/11* (2023.01); *H04N 23/75* (2023.01)

(58) Field of Classification Search
CPC .... G06V 10/70; G06V 10/141; G06V 10/143; G06V 10/147; G06V 20/20; G06V 30/2247; H04N 23/11; H04N 23/75; H04N 23/61; H04N 23/632; H04N 23/667; H04N 23/74
(Continued)

(56) References Cited

U.S. PATENT DOCUMENTS

2019/0287256 A1*    9/2019    Iwahashi ................. G01S 17/10

FOREIGN PATENT DOCUMENTS

JP    2006-166077 A    6/2006
JP    2014-216734 A    11/2014

* cited by examiner

*Primary Examiner* — Stephen P Coleman
(74) *Attorney, Agent, or Firm* — Cowan, Liebowitz & Latman, P.C.

(57) ABSTRACT

An image capturing apparatus capable of performing pattern recognition with high accuracy without decreasing customer satisfaction and performing image capturing control according to a capturing scene based on a result of the pattern recognition. The image capturing apparatus includes an image sensor that includes a photoelectric conversion section including first type pixels that receive visible light from a light flux from an object and output a visible light image and second type pixels that receive invisible light from the light flux and output an invisible light image, a memory device that stores instructions, and a processor that executes the instructions to perform pattern recognition of the invisible light image, and to switch an image capturing control for capturing the visible light image from a first image capturing control to a second image capturing control when a specific pattern is detected from the invisible light image through the pattern recognition.

18 Claims, 14 Drawing Sheets

(51) Int. Cl.
*H04N 23/11* (2023.01)
*H04N 23/75* (2023.01)

(58) Field of Classification Search
USPC .......................................................... 382/181
See application file for complete search history.

IMAGE CAPTURING APPARATUS THAT SWITCHES IMAGE CAPTURING CONTROL ACCORDING TO CAPTURING SCENE, INFORMATION PROCESSING APPARATUS, CONTROL METHODS THEREFOR, AND STORAGE MEDIA STORING CONTROL PROGRAMS THEREFOR

BACKGROUND OF THE INVENTION

Field of the Invention

The present invention relates to an image capturing apparatus, an information processing apparatus, control methods therefor, and storage media storing control programs therefor. In particular, the present invention relates to the image capturing apparatus that switches image capturing control in accordance with a capturing scene, the information processing apparatus that links a plurality of image capturing apparatuses, the control methods therefor, and the storage media storing the control programs therefor.

Description of the Related Art

In certain capturing scenes, there are actions that are prevented in photography, i.e., taboo actions of photography. For example, in sports such as golf and tennis, photography generating sound is often prohibited. In addition, flash photography is often prohibited for art appreciation in museums. In the past, in order to prevent taboo actions of photography, a no-photography mark was placed adjacent to an exhibit or an announcement was made in advance that photography was prohibited. However, such methods cannot prevent a user from unintentionally and accidentally performing the taboo action of photography.

In addition, one of causes of hindrance to spread of wearable devices such as smart glasses is a problem of invasion of privacy because photographing and recording are possible anywhere.

In order to prevent a taboo action and photographing or recording that causes invasion of privacy using a device, such as a camera or a wearable device, as described above, it is desirable that the device appropriately performs image capturing control based on a recognition result of an object. For example, Japanese Laid-Open Patent Publication (Kokai) No. 2006-166077 (JP 2006-166077A) discloses a camera that prohibits flash emission when a firework or a specific person is detected as an object.

However, when the no-photography mark is disposed near the exhibit or the hall announcement is performed as in the conventional method, not only the above-described unintended photographing taboo action cannot be prevented but also customer satisfaction may be lowered.

In the above-described publication, a plurality of patterns for recognizing a firework or a specific person as an object are held. However, it may be difficult to perform pattern recognition of a firework or a specific person with the held patterns. For example, there is a case where the object changes to a shape deviating from the held pattern, such as a case where the shape of a firework is deformed by wind or a case where the specific person faces backward. In addition, it is necessary to hold a large number of patterns for respective scenes, which leads to an increase in cost.

SUMMARY OF THE INVENTION

The present invention provides an image capturing apparatus, an information processing apparatus, control methods therefor, and storage media storing control programs therefor, which are capable of performing pattern recognition with high accuracy without decreasing customer satisfaction and performing image capturing control according to a capturing scene based on a result of the pattern recognition.

Accordingly, an aspect of the present invention provides an image capturing apparatus including an image sensor that includes a photoelectric conversion section including first type pixels that receive visible light from a light flux from an object and output a visible light image and second type pixels that receive invisible light from the light flux and output an invisible light image, a memory device that stores instructions, and a processor that executes the instructions to perform pattern recognition of the invisible light image, and to switch an image capturing control for capturing the visible light image from a first image capturing control to a second image capturing control when a specific pattern is detected from the invisible light image through the pattern recognition.

According to the present invention, it is possible to perform pattern recognition with high accuracy without reducing customer satisfaction, and to perform image capturing control according to a capturing scene based on a result of the pattern recognition.

Further features of the present invention will become apparent from the following description of exemplary embodiments with reference to the attached drawings.

DESCRIPTION OF THE EMBODIMENTS

Figure 1:
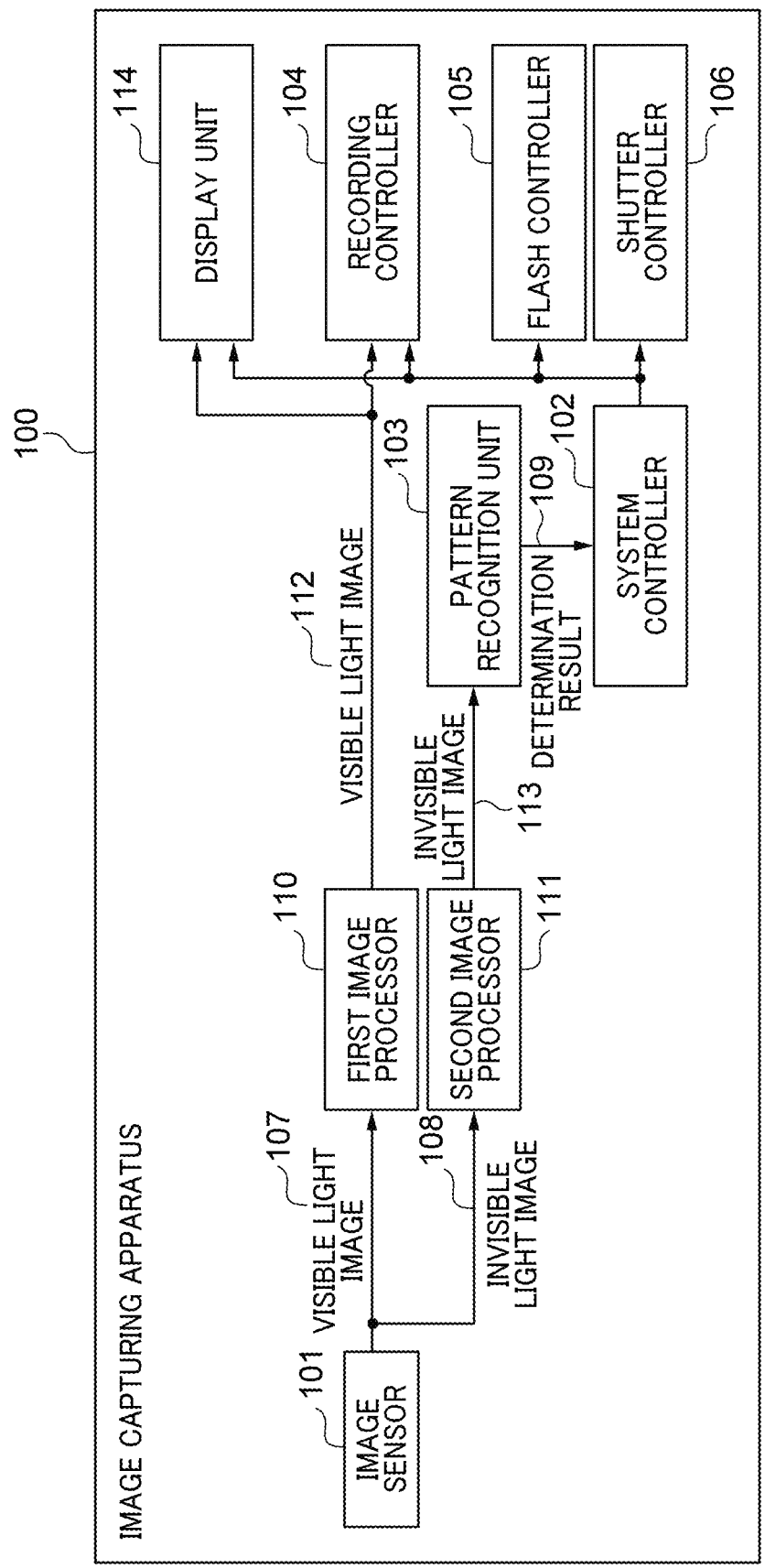
FIG. 1 is a block diagram showing a hardware configuration of an image capturing apparatus according to a first embodiment.

Hereafter, embodiments according to the present invention will be described in detail by referring to the drawings. In the drawings, the same members are denoted by the same reference numerals, and redundant description will be omitted. It should be noted that embodiments described below are merely examples, and the present invention is not limited to the configurations described in the embodiments.

Hereinafter, the image capturing apparatus 100 according to the first embodiment of the present invention will be described with reference to the drawings as appropriate. In this embodiment, when a specific pattern is detected from an invisible light image obtained by capturing an image with the image capturing apparatus 100, specific controls of image capturing controls are switched.

FIG. 1 is a block diagram illustrating a hardware configuration of an image capturing apparatus 100 according to this embodiment.

In FIG. 1, the image capturing apparatus 100 includes an image sensor 101, a system controller (control means) 102, a pattern recognition unit (pattern recognition means) 103, a recording controller (recording control means) 104, a flash controller (flash control means) 105, a shutter controller 106, a first image processor (first image processing means) 110, a second image processor (second image processing means) 111, and a display unit (display means) 114.

The image sensor 101 converts an object image into an electric signal by photoelectric conversion and outputs the electric signal as an image signal. Although details will be described later with reference to FIG. 2, the image sensor 101 includes first type pixels having sensitivity to visible light and second type pixels having sensitivity to invisible light. The image sensor 101 outputs an image signal (a visible light signal) output from the first type pixels having sensitivity to visible light to the first image processor 110 as a visible light image 107. The image sensor 101 outputs an image signal (an invisible light signal) output from the second type pixels having sensitivity to invisible light to the second image processor 111 as an invisible light image 108.

The system controller 102 controls the entire imaging apparatus 100. The system controller 102 in this embodiment receives a determination result 109 (a result of pattern recognition) of the pattern recognition unit 103 and instructs switching of specific controls among image capturing controls of the image capturing apparatus 100. Although details of the specific controls will be described later with reference to FIG. 3, the specific controls include a control of a recording operation of a captured still image or moving image by the recording controller 104, a control of a flash emission operation by the flash controller 105, and a control of a shutter operation by a shutter controller (shutter control means) 106. The system controller 102 reads various programs stored (stored) in a storage unit (not shown) and executes an arithmetic process and a control process according to the read programs.

When receiving an invisible light image 113 from the second image processor 111, the pattern recognition unit 103 performs pattern recognition of the invisible light image 113, determines whether a specific pattern is detected, and outputs the determination result 109 to the system controller 102. Since a pattern recognition method is not a gist of the present invention, a detailed description thereof is omitted, but a known technique such as template matching can be used.

The recording controller 104 controls recording of a visible light image 112 from the first image processor 110 to a recording medium (not shown). When the specific pattern is detected, the system controller 102 switches the control by the recording controller 104 from a first image capturing control of permitting the recording of the visible light image 112 to the recording medium to a second image capturing control of prohibiting the recording. Accordingly, even if a release button (not shown) of the image capturing apparatus 100 is pressed in a scene in which image capturing is prohibited, it is possible to control so as not to record the visible light image 112 to the recording medium. In this embodiment, the recording medium (not shown) serving as a recording destination of the visible light image 112 is not particularly limited. For example, a detachable memory card, a built-in memory (not shown) of the imaging apparatus 100, or an external apparatus (not shown) communicably connected through a communication interface can be employed.

The flash controller 105 controls light emission of a flash emission unit (not shown) to illuminate an object of the image capturing apparatus 100. When the above specific pattern is detected, the system controller 102 switches the control to the flash controller 105 from a first image capturing control of permitting the flash emission unit to emit light to a second image capturing control of prohibiting the flash emission unit from emitting light. As a result, in a scene where flash photography is prohibited, it is possible to control so as not to perform the flash photography by the image capturing apparatus 100. It should be noted that the flash emission unit may be built in the image capturing apparatus 100 or may be an external apparatus (not shown) communicably connected via a communication interface.

The shutter controller 106 controls a mechanical shutter (not shown) and an electronic shutter (not shown) used when the image capturing apparatus 100 captures an image. When the above specific pattern is detected, the system controller 102 switches the control of the shutter controller 106 from a first image capturing control of permitting use of the mechanical shutter to a second image capturing control of prohibiting the use of the mechanical shutter. Accordingly, in a scene where a silent operation is required, the image capturing apparatus 100 uses the electronic shutter in capturing an image and it is possible to control so as not to perform photography generating sound.

When receiving the visible light image 107 from the image sensor 101, the first the image processor 110 applies image processes, such as a gamma correction process, a white balance process, and a development process, to the input visible light image 107 to generate the visible light image 112. Thereafter, the first image processor 110 outputs the generated visible light image 112 to the recording controller 104 and display unit 114.

When receiving the invisible light image 108 from the image sensor 101, the second the image processor 111 applies image processes, such as a gamma correction process, a white balance process, and a development process, to the input invisible light image 108 to generate the invisible light image 113. After that, the first the image processor 110 outputs the generated invisible light image 113 to the pattern recognition unit 103. Although the first and second the image processors 110 and 111 are divided corresponding to the types of the images subjected to the image processes in this embodiment for convenience of description, the processors may be combined into one. In addition, the image sensor 101 divides signals into the image signal of the visible light image 107 and the image signal of the invisible light image 108 and outputs the two signals to the first and second image processing units 110 and 111. However, the present invention is not limited thereto. For example, a single signal that is not divided into the visible light image 107 and the invisible light image 108 may be output to one image processor. In this case, the single image processor divides the single signal output from the image sensor 101 into the visible light image 107 and the invisible light image 108 and applies the image processes to each of the image signals to generate the visible light image 112 and the invisible light image 113.

The display unit 114 is a display device, such as a liquid crystal display or an organic EL display, that displays the visible light image 112 obtained from the first image processing unit 110, an operation screen (a menu screen) for operating the imaging apparatus 100, etc. Although details will be described with reference to FIG. 6, when receiving the determination result 109 from the pattern recognition unit 103, the system controller 102 displays a mark 602 indicating the determination result 109 on the display unit 114 together with the visible light image 112.

The configuration of the image sensor 101 will now be described with reference to FIG. 2A, FIG. 2B and FIG. 2C.

Figure 2A:
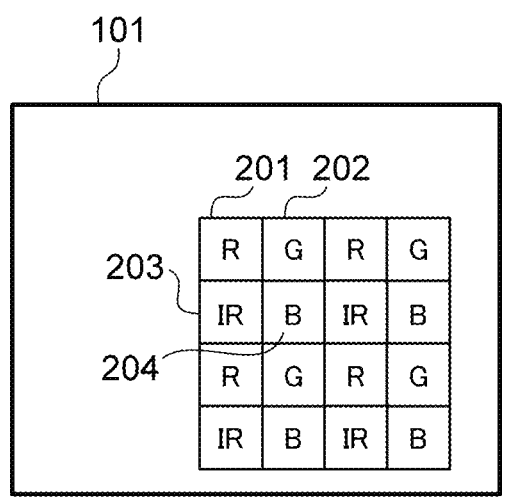
FIG. 2A, FIG. 2B, and FIG. 2C are views schematically showing parts of a configuration of an image sensor.
Figure 2B:
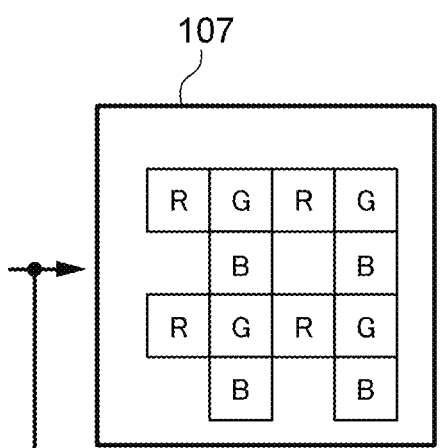
Figure 2C:
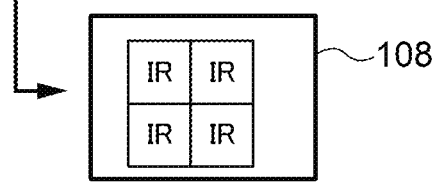

FIG. 2A is a view schematically showing a 4-by-4 array of 16 pixels extracted from an array of pixels of the image sensor 101 in order to simplify the description. The image sensor 101 has a photoelectric conversion section in which photoelectric conversion elements (pixels) like photodiodes are arranged in a two-dimensional array. Color filters 201, 202, 203, and 204 that permit transmission of specific wavelength bands of a light beam from an object are provided above the photoelectric conversion elements. In FIG. 2A, the color filter 201 labeled "R" is a filter that permits transmission of red light, and the color filter 202 labeled "G" is a filter that permits transmission of green light. In FIG. 2A, the color filter 204 labeled "B" is a filter that permits transmission of blue light. These color filters 201, 202, and 204 are regularly arranged in what is called the Bayer array. In the normal Bayer array, a color filter that permits transmission of green light is also disposed at a position that is paired with the color filter 202. In the meantime, the color filter 203 labeled "IR" that transmits infrared light (hereinafter referred to as "IR") is disposed at this position in this embodiment.

Although the color filter 203 permits transmission of IR in this embodiment, it is not limited to this as long as it permits transmission of invisible light. For example, the color filter 203 may permit transmission of only ultraviolet light of which a wavelength band is equal to or shorter than 380 nm. In addition, the color filter 203 may permit transmission of only far-infrared light of which a wavelength band is equal to or greater than 25000 nm, may permit transmission of only near-infrared light in a wavelength band from 750 nm to 2500 nm, or may permit transmission of only mid-infrared light in a wavelength band from 2500 nm to 25000 nm. The color filter 203 may permit transmission of lights of a plurality of invisible light wavelength bands, for example, near-infrared light and mid-infrared light.

The light beams transmitted through the color filters 201 to 204 are received by the pixels disposed right under the color filters 201 to 204. The light beams are photoelectrically converted and are output from the image sensor 101 as image signals of red, blue, green, and IR. Among these image signals, the signals output from the pixels right under the visible light color filters 201, 202, and 204 are output to the first image processor 110 as the visible light image 107 as shown in FIG. 2B. In the meantime, among these image signals, the signals output from the pixels right under the invisible light color filters 203 are output to the second image processing unit 111 as the invisible light image 108 as shown in FIG. 2C. The first image processor 110 may apply an interpolation process to the visible light image 107 so as to interpolate an output of a pixel to which the color filter 203 for the invisible light is arranged. Such a configuration enables to obtain the visible light image 107 and the invisible light image 108 simultaneously from the one image sensor 101.

Although the color filters 201, 202, and 204 for the visible light and the color filters 203 for the invisible light are disposed in the one imaging element 101 in this embodiment, the present invention is not limited to this configuration. For example, the color filters of the image sensor 101 may be arranged in the normal Bayer arrangement, and the color filters for invisible light may be arranged so as to be removable from the optical path between the image sensor 101 and the object. In addition, the color filters of the image sensor 101 may be arranged in the normal Bayer arrangement, and the invisible light image 108 may be captured by another image sensor to which a color filter that transmits only invisible light is arranged.

Figure 3:
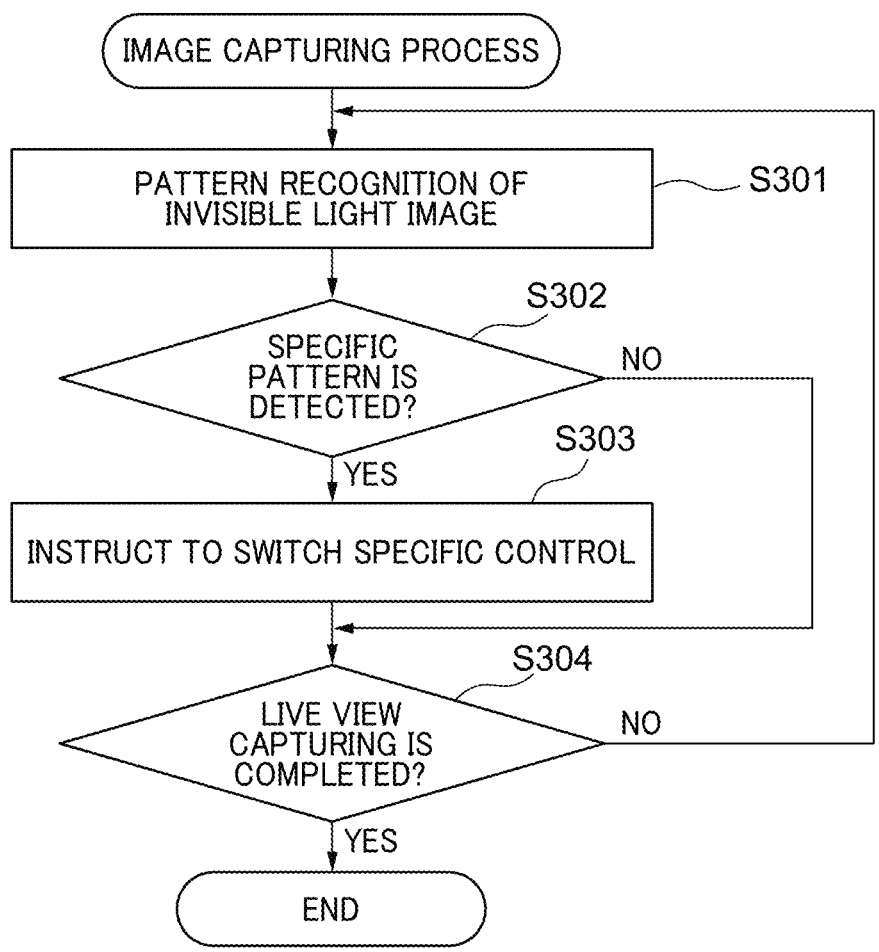
FIG. 3 is a flowchart showing an image capturing process performed in the image capturing apparatus according to the first embodiment.

Next, an image capturing process in this embodiment will be described with reference to the flowchart in FIG. 3. This image capturing process is characterized by a step S303 for switching specific controls in capturing an image, and starts when a power button (not shown) in the image capturing apparatus 100 is turned ON and what is called live view capturing starts. The image capturing process is achieved by the system controller 102 executing a control program and controlling each part of the image capturing apparatus 100.

In a step S301, when receiving the invisible light image 113 from the second image processor 111, the pattern recognition unit 103 performs the pattern recognition of the invisible light image 113. A specific method of pattern recognition will be described later.

In a step S302, the pattern recognition unit 103 determines whether the specific pattern is detected from the invisible light image 113 based on the pattern recognition result obtained in the step S301 and outputs the determination result 109 to the system controller 102. When the specific pattern is detected (YES in the step S302), the determination result 109 including the detected specific pattern is transferred to the system controller 102, and then the process proceeds to a step S303. Otherwise (NO in the step S302), the process proceeds to a step S304.

In the step S303, the system controller 102 analyzes the specific pattern detected in the step S302, instructs switching of specific controls according to the analysis result, and then proceeds with the process to the step S304.

Three examples of the specific controls according to this embodiment will now be described.

The first specific control is a flash emission control. Specifically, when the specific pattern is not detected in the step S302, the system controller 102 permits the flash controller 105 to perform flash emission. In the meantime, when the specific pattern is detected in the step S302, the system controller 102 causes the flash controller 105 to prohibit flash emission. In this way, it is possible to prevent a user from erroneously performing flash photography in a capturing scene where the flash photography is prohibited.

The second particular control is a shutter control. Specifically, when the specific pattern is not detected in the step S302, the system controller 102 permits the shutter controller 106 to shift to a mechanical shutter capturing mode. In the meantime, when the specific pattern is detected in the step S302, the system controller 102 prohibits the shutter control unit 106 from shifting to the mechanical shutter capturing mode, and permits only shifting to an electronic shutter capturing mode. In this way, it is possible to prevent a user from erroneously performing photography generating sound in a capturing scene where the photography generating sound is prohibited. This is because an electronic shutter does not control a physical shutter in general, and thus enables silent photography as compared with a mechanical shutter.

The third specific control is a recording control. Specifically, when the specific pattern is not detected in the step S302, the system controller 102 permits the recording controller 104 to record a photography result (the visible light image 112). In the meantime, when the specific pattern is detected in the step S302, the system controller 102 prohibits the recording controller 104 from performing the recording operation. In this way, even when a user erroneously performs photography (for example, photography causing invasion of privacy), it is possible to prevent a photography result from being recorded.

In addition, the above-described three specific controls switch so that the operation (for example, flash emission) permitted before the specific pattern is detected in the step S302 will be prohibited after the specific pattern is detected in the step S302. However, the present invention is not limited thereto. For example, an operation (for example, automatic capturing of the visible light image 112 (a recording operation of a live view image)) that is prohibited when the specific pattern is not detected in the step S302 may be permitted when the specific pattern is detected in the step S302.

After the specific control is switched in the step S303 or after it is determined that the specific pattern is not detected in the step S302, the system controller 102 determines whether the live view capturing is completed in the step S304. When it is completed (YES in the step S304), the main image capturing process is finished. When it is not completed (NO in the step S304), the process returns to the step S301.

Next, the specific pattern that is subjected to the determination of whether it is detected from the invisible light image 113 in the step S302 in FIG. 3 will be described with reference to FIG. 4A, FIG. 4B, and FIG. 4C.

Figure 4A:
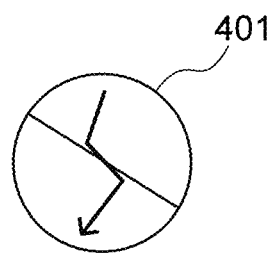
FIG. 4A, FIG. 4B, and FIG. 4C are views showing specific patterns detected from an invisible light image.
Figure 4B:
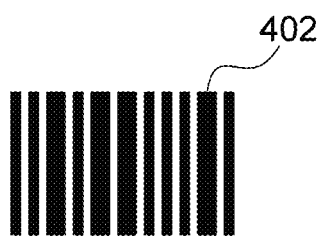
Figure 4C:

FIG. 4A, FIG. 4B, and FIG. 4C show three specific patterns. All of the specific patterns described below are drawn with ink that reflects or emits invisible light (hereinafter referred to as invisible ink).

FIG. 4A is a view showing an example of a particular pattern consisting of a mark 401 prohibiting flash emission. When the mark 401 as shown in FIG. 4A is a specific pattern, a user can visually and easily verify that the image capturing apparatus 100 has been switched to a flash emission prohibition mode by developing (visualizing) the invisible light image 113.

FIG. 4B is a view showing an example of a particular pattern consisting of a bar code (a one dimensional bar code) 402 prohibiting flash emission. When the specific pattern arranged on the object is the bar code 402 as shown in FIG. 4B, the size of the pattern can be easily standardized and a large number of patterns can be easily generated.

FIG. 4C is a view showing an example of a specific pattern consisting of a QR Code™ (a two dimensional barcode) 403 prohibiting flash emission. When the specific pattern is the QR code 403, the pattern size can be easily standardized and a large number of patterns can be easily generated, as with the case where the specific pattern is the bar code 402 in FIG. 4B. Alternatively, a combination of a bar code and a QR code may be used as the specific pattern.

Next, a method of arranging a specific pattern on an object in this embodiment will be described with reference to FIG. 5A and FIG. 5B. In this embodiment, a case where the QR code 403 in FIG. 4C as a specific pattern is arranged on clothes of an object will be exemplified. Since the QR code 403 in FIG. 4C is drawn on a transparent colorless seal with the invisible ink, it can be easily attached to clothes or a cap of an object person or arranged near an art object. Since this seal is invisible to a naked eye, it can be arranged anywhere without disturbing scenery. Although sponsor marks are usually concentrated on conspicuous places, such as clothes or a helmet worn by a motorsports player, the seal on which the QR code 403 is drawn can be freely attached without encroaching on the space of the sponsor marks. Instead of the seal, the specific pattern may be printed with the invisible ink on clothes or a cap of an object person or a close place of an art object. Since this pattern is also invisible to a naked eye, it can be printed anywhere without disturbing scenery.

Figure 5A:
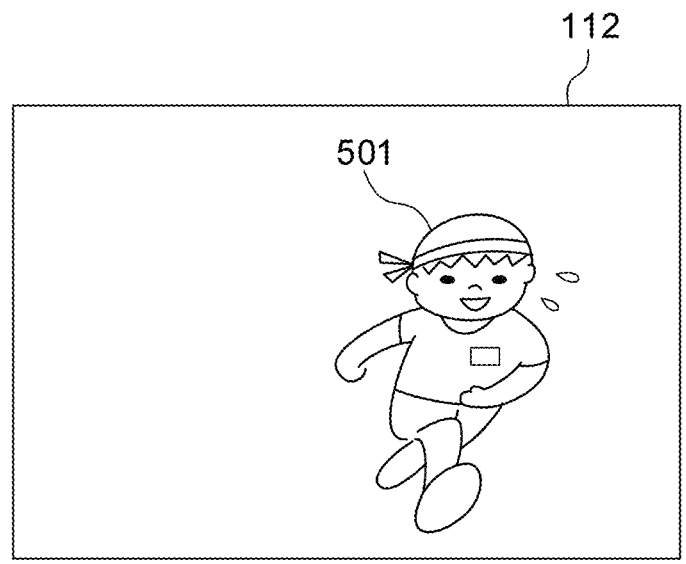
FIG. 5A and FIG. 5B are views describing a capturing scene including an object subject to which a seal on which a specific pattern is drawn with invisible ink is attached.
Figure 5B:
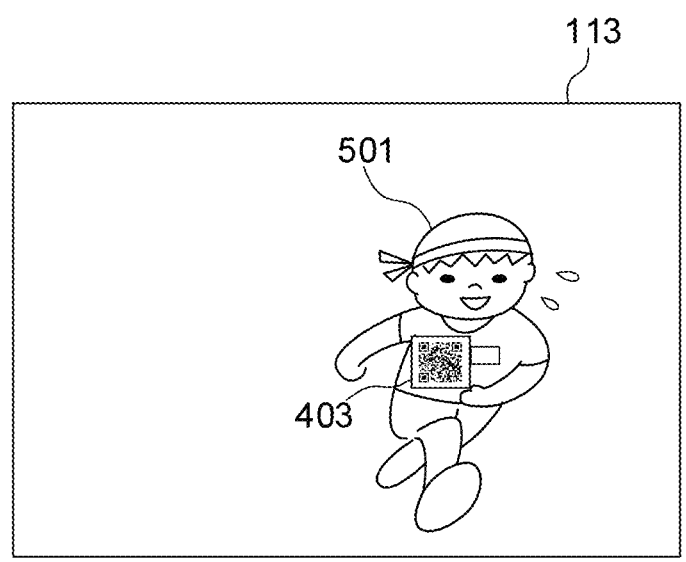

FIG. 5A represents the visible light image 112 including an object 501 displayed as the live view image by the display unit 114, and FIG. 5B represents the invisible light image 113.

As shown in FIG. 5A, only the subject 501 is displayed in the visible light image 112 without disturbing scenery.

In the meantime, as shown in the invisible light image 113 in FIG. 5B, a seal on which the QR code 403 is drawn with the invisible ink as the specific pattern is attached to a shirt of the object 501. The pattern recognition unit 103 performs the pattern recognition using the invisible light image 113 input. Here, since the QR code 403 is detected as the specific pattern, the pattern recognition unit 103 transfers the determination result including the detected QR code 403 to the system controller 102. The system controller 102 analyzes the QR code 403 transferred from the pattern recognition unit 103 and automatically switches the specific control according to an analysis result. Here, since the QR code 403 means prohibition of the flash emission, the system controller 102 switches the flash emission control that is the specific control. More specifically, the system controller 102 switches the strobe control unit 105 from a flash emission permission mode to the flash emission prohibition mode.

Since the flash emission control is automatically switched in the imaging apparatus 100 as described above, it is possible to prevent a user from erroneously performing the flash photography.

Next, a method of displaying a live view image on the display unit 114 when the specific pattern is detected in this embodiment will be described with reference to FIG. 6. Hereinafter, an example in which the pattern recognition unit 103 detects the specific pattern for prohibiting the flash photography from the invisible light image 113 and the display unit 114 displays that the flash emission prohibition mode is set will be described.

Figure 6:
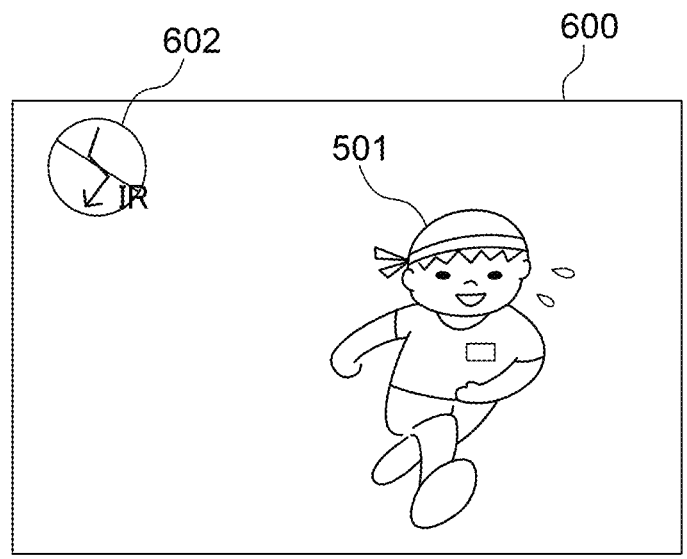
FIG. 6 is a view showing a live view image according to the first embodiment when the specific pattern is detected from the invisible light image.

FIG. 6 shows the visible light image 112 including the object 501 displayed as a live view image 600 on the display unit 114. In the live view image 600, a mark 602 indicating the flash emission prohibition mode is visibly superimposed on the visible light image 112 (FIG. 5A) including the object 501. When the pattern recognition unit 103 detects the QR code 403 as the specific pattern from the invisible light image 113, the system controller 102 sets the flash controller 105 to the flash emission prohibition mode and the display unit 114 displays the mark 602. In this way, the user can be notified that the mode has been switched.

The display timing of the mark 602 is not limited to the time point (first timing) at which the pattern recognition unit 103 detects the QR code 403 as the specific pattern. For example, the display timing of the mark 602 may be a time point (second timing) at which the QR code 403 is detected as the specific pattern and the user attempts to perform the flash emission control. As described above, since the QR code 403 drawn with the invisible ink cannot be recognized by the naked eye. Therefore, when the mark 602 unexpectedly appears in the live view image at the first timing, attention of the user may be hindered. Since the mark 602 appears in the live view image for the first time at the second timing at which the user attempts to perform erroneous flash photography, usability is improved.

It should be noted that notification means other than display of the mark 602 may be used. For example, the image capturing apparatus 100 may notify the user that the mode has been switched using sound, light, vibration, or the like.

In addition, there may be a case where a specific control of the image capturing apparatus 100 is switched in advance by a user operation. For example, the image capturing apparatus 100 may be shifted to the flash emission prohibition mode in advance by a user operation. In such a case, even if the pattern recognition unit 103 detects the QR code 403 as the specific pattern, the mark 602 may not appear in the live view image.

Next, a method of switching ON/OFF of reading of the invisible light signal by the image sensor 101 based on a user operation to the menu screen displayed on the display device will be described by referring to FIG. 7. As mentioned above, the image capturing apparatus 100 can read the visible light signal and the invisible light signal simultaneously by the image sensor 101. However, the user may set so as not to read the invisible light signal for the purpose of saving power. Such a setting can save power because of stopping the processing block, which includes an A/D convertor that converts the invisible light signal read by the image sensor 101 into the invisible light image 108, the second image processor 111 that processes the invisible light image 108, and the pattern recognition unit 103. However, in this case, since the pattern recognition of the invisible light image 113 described above cannot be performed, the specific control is not switched. Therefore, it is necessary to alert the user that the specific control is not automatically switched in the image capturing apparatus 100.

Figure 7:
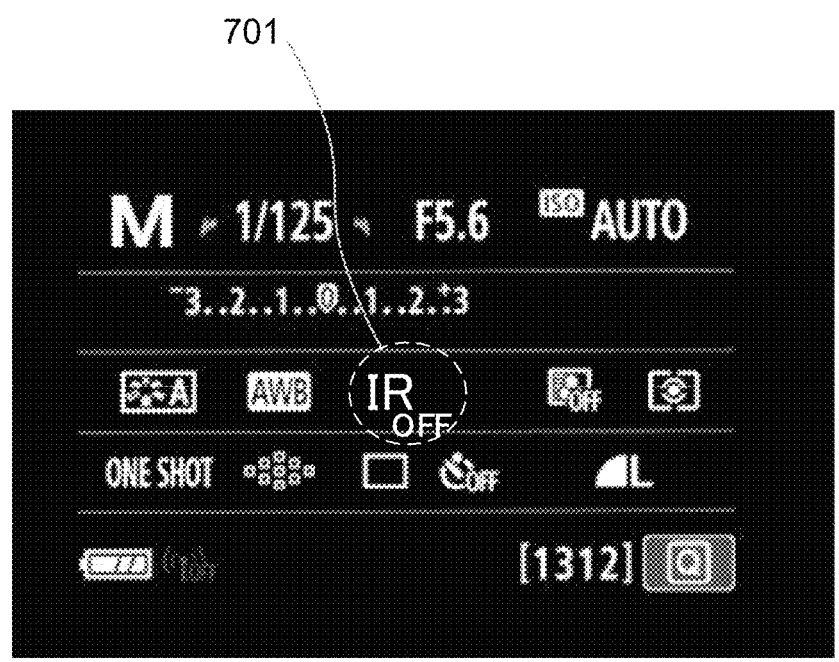
FIG. 7 is a view showing a menu screen according to the first embodiment displayed when a user turns OFF reading of a invisible light signal.

FIG. 7 shows an example of the menu screen displayed on the display unit 114 when the user turns OFF the reading of the invisible light signal by the image sensor 101.

When the user selects the invisible-light-off-mode switch button 701 in the menu screen, the image sensor 101 can turn off reading of the invisible light signal. Also in this case, the display unit 114 switches the display of the invisible-light-off-mode switch button 701 to "IR OFF" as shown in FIG. 7. Also, the display unit 114 displays notification 702 on the menu screen in switching the display to alert that the image capturing apparatus 100 does not restrict the specific control automatically. For example, as shown in the FIG. 7, the description "Please note that flash photography and photography generating sound are not automatically restricted." is displayed as the notification 702 on the menu screen.

The initial setting for reading the invisible light signal by the image sensor 101 is ON, and the initial display for the invisible-light-off-mode switch button 701 is "IR ON".

When selecting the invisible-light-off-mode switch button 701, the user can switch ON/OFF of the reading of the invisible light signal by the image sensor 101. Further, when the user selects the invisible-light-off-mode switch button 701 on the menu screen in FIG. 7, the display unit 114 switches the display of the invisible-light-off-mode switch button 701 to "IR ON". At this time, the display of the notification 702 on the menu screen also ends.

As described above, the transparent colorless seal on which the specific pattern is drawn with the invisible ink is attached to the object or a conspicuous place near the object in this embodiment. Thereafter, when the pattern recognition unit 103 recognizes a specific pattern from the invisible light image 113 obtained by the live view photography of the object, the system controller 102 automatically switches the specific control in the image capturing apparatus 100 in accordance with the recognized specific pattern. As a result, the image capturing apparatus 100 is possible to perform the pattern recognition with high accuracy without reducing customer satisfaction and to perform capturing control according to the capturing scene based on the pattern recognition result.

A second embodiment of the present invention will now be described with appropriate reference to the drawings. In this embodiment, an example will be described in which a specific pattern is projected with invisible light by a projection apparatus in a wide space such as a stage, a movie theater, or a live venue.

Figure 8:
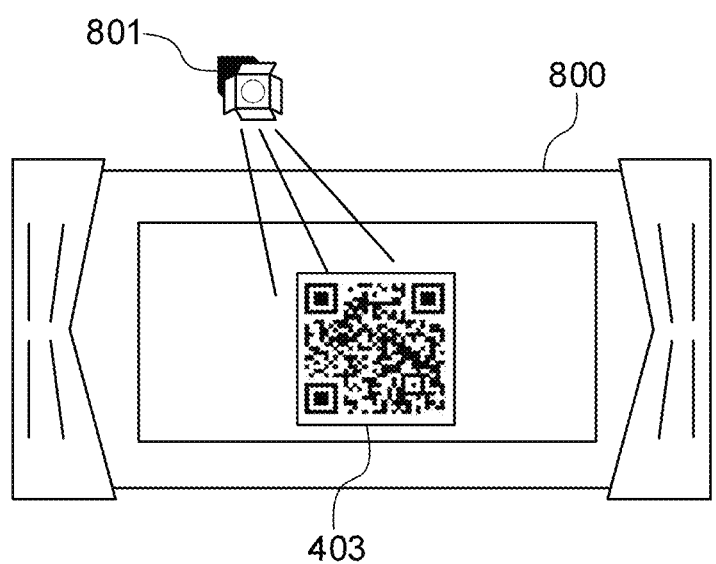
FIG. 8 is a view showing a screen of a movie theater as an object that is live-view captured by an image capturing apparatus according to a second embodiment.

FIG. 8 is a view showing a screen 800 of a movie theater as an object in this embodiment that is live-view captured by the image capturing apparatus 100.

As shown in FIG. 8, a projector 801 projects a QR code 403 as a specific pattern onto the screen 800 in the movie theater with the invisible light in this embodiment.

In the first embodiment of the present invention, it is assumed that the transparent colorless seal on which the QR code 403 is drawn with the invisible ink is attached to an object or a conspicuous place near the object. In this case, it is necessary to prepare a large number of seals whenever the number of objects increases, and it takes time to print the QR code 403 on seals with the invisible ink and to attach the seals to the objects. In some cases, the size of the QR code 403 printed on a seal may be changed according to the size of the object. For example, the size of the QR code 403 printed on the seal attached a large object, such as a car or a train, is preferably larger than that attached to a person. In addition, when the object to which the seal is attached to the front surface faces sideways or backward with respect to the image capturing apparatus 100, the QR code 403 drawn on the seal may not be accurately detected by the image capturing apparatus 100.

Therefore, the projector 801 projects the QR code 403 on the screen 800 with the invisible light in this embodiment. In this way, the QR code 403 can be projected on the screen 800 in an optimum size at an optimum timing.

This embodiment can also be applied to outdoor sports such as golf. In this case, it is preferable to project the QR code 403 as the specific pattern onto the object with invisible light by a known projecting technique such as a projection mapping. Thus, even when the object faces sideways or backward, the QR code 403 can be arranged at a position where the image capturing apparatus 100 can reliably perform pattern recognition.

As described above, this embodiment can improve the detection accuracy of the pattern recognition unit 103 as compared with the first embodiment.

Next, the timing at which the projector 801 projects the QR code 403 as the specific pattern onto the screen 800 will be described with reference to FIG. 9A, FIG. 9B, and FIG. 9C. Since the QR code 403 is projected onto the screen 800 with the invisible light, a light emission amount when the projector 801 projects the QR code 403 on the screen 800 does not necessarily need to be constant in a time direction.

Figure 9A:
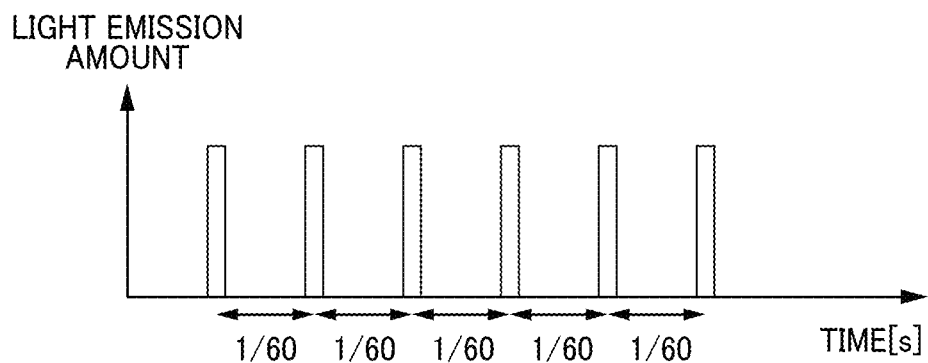
FIG. 9A, FIG. 9B, and FIG. 9C are views showing timings at which a projector in FIG. 8 projects the specific pattern onto the screen with invisible light.
Figure 9B:
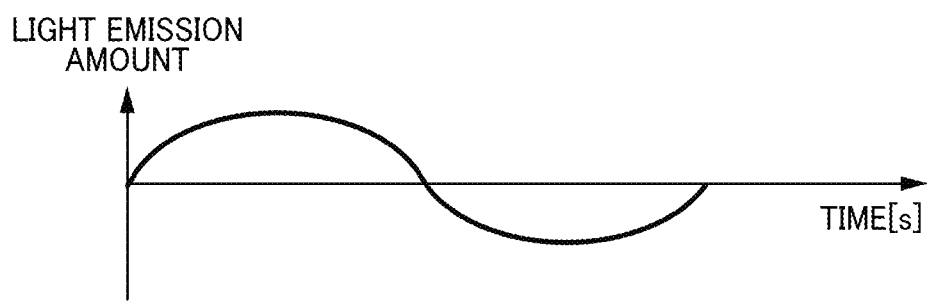

For example, as shown in FIG. 9A, the projector 801 may blink the invisible light illumination at a cycle of 1/60 seconds, and the pattern recognition unit 103 may recognize the light emission pattern at a constant cycle in the time direction.

Figure 9C:
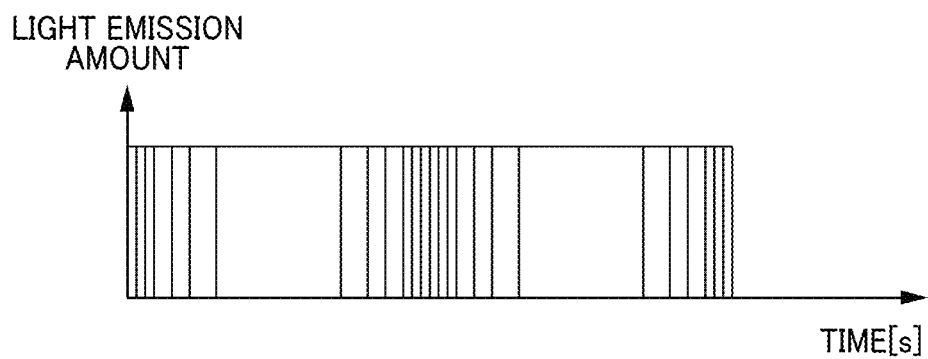

In addition, as shown in FIG. 9C, the projector 801 may emit the invisible light in a light emission pattern at an indefinite cycle in the time direction, such as a EA modulating method. The light emission pattern shown in FIG. 9C is a specific pattern represented by density or width of light emission time obtained by the EA modulation of a sinusoidal wave shown in FIG. 9B.

Figure 10:
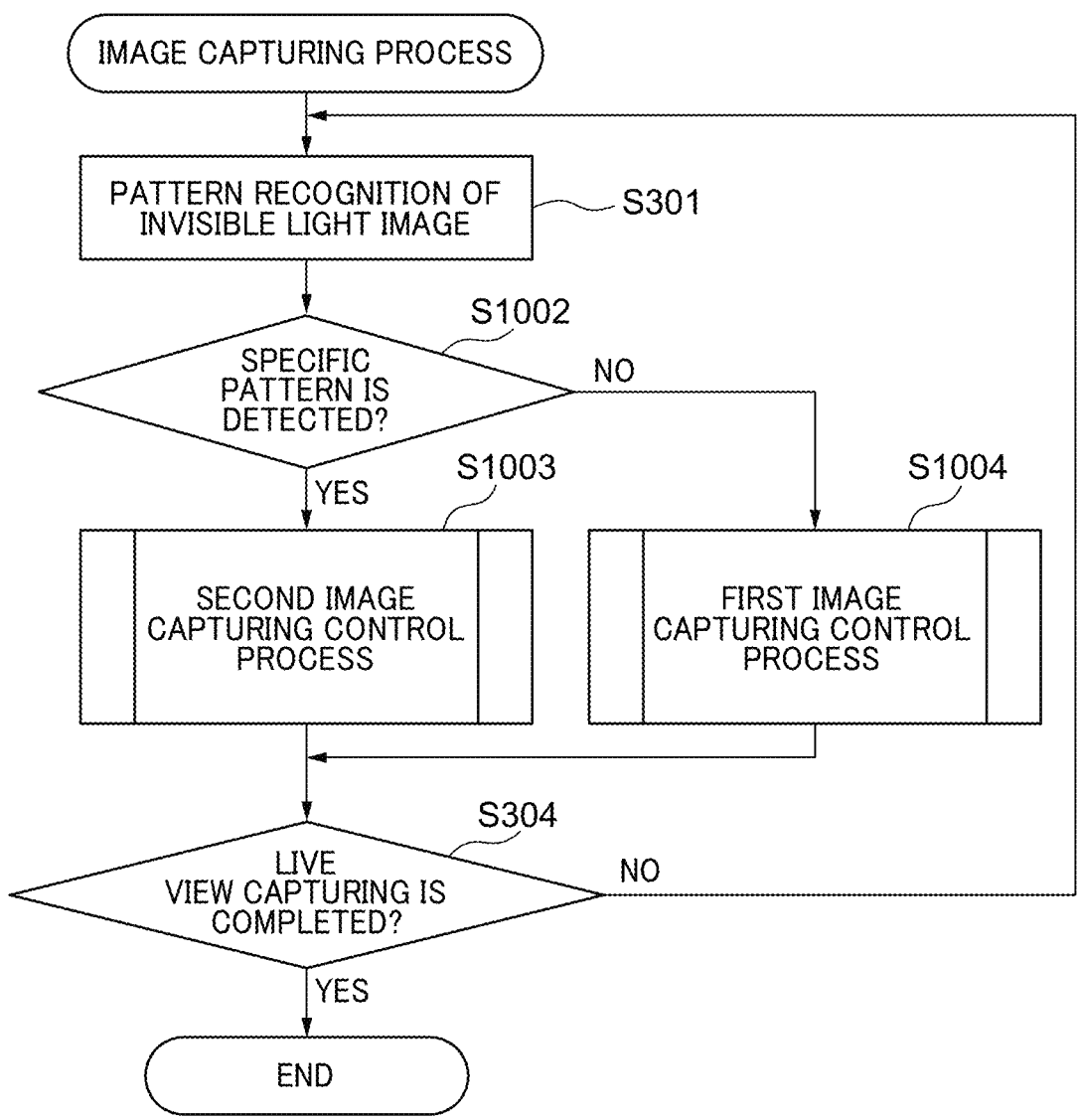
FIG. 10 is a flowchart showing an image capturing process performed in the image capturing apparatus according to the second embodiment.

Next, an image capturing process in this embodiment will be described with reference to a flowchart in FIG. 10. Descriptions of the same portions as those of the image capturing process (FIG. 3) executed in the first embodiment will be omitted.

The difference between this embodiment and the first embodiment is that steps S1002 through S1004 are executed instead of the steps S302 and S303.

In a step S1002, the pattern recognition unit 103 determines whether the QR code 403 is detected as the specific pattern from the invisible light image 113. When the specific pattern is detected (YES in the step S1002), the process proceeds to a step S1003. A second image capturing control process is executed in the step S1003 to switch the mode to the flash emission prohibition mode, and then the process proceeds to the step S304. In the meantime, when the specific pattern is not detected (NO in the step S1002), the process proceeds to a step S1004. A first image capturing control process is executed in the step S1004 to switch the mode to the flash emission permission mode as a normal mode, and then the process proceeds to the step S304. Although the flash emission permission mode is exemplified as the normal mode, the normal mode is not limited to the flash emission permission mode as long as the setting of image capturing conditions designated by the user is permitted. Similarly, although the mode is switched to the flash emission prohibition mode when the specific pattern is detected, the mode is not limited to this as long as the control mode sets the image capturing conditions corresponding to the specific pattern.

In this way, when the scene of the movie being screened is a special scene in which the specific pattern is projected onto the screen 800 by the projector 801, the image capturing device 100 controls so as to automatically restrict (prohibit) a predetermined operation (such as flash emission). In the meantime, when a normal scene in which a specific pattern is not projected onto the screen 800 by the projector 801 continues for a certain period of time in the movie being screened, the image capturing apparatus 100 controls so as to automatically returns to the initial setting in which a predetermined operation (such as flash emission) is permitted. This eliminates the need for the user to return the mode of the image capturing apparatus 100 to the original initial setting every time the movie returns from the special scene to the normal scene, thereby improving usability.

In addition, although an act of capturing a movie in a movie theater (such as illegal capturing) is generally prohibited, a user may intentionally perform the illegal capturing. Accordingly, in order to prevent the illegal capturing, the projector 801 continuously projects the specific pattern with the invisible light onto the screen 800 during screening. When detecting the specific pattern from the invisible light image 113, the pattern recognition unit 103 switches from the control that allows the image capturing apparatus 100 to record the visible light image 112 into the recording medium to the control that prohibits such recording. Accordingly, the image capturing apparatus 100 is possible to prevent misconduct such as the illegal capturing and to prevent intentional misconduct by the user.

Similarly to the first embodiment, also in this embodiment, when the specific pattern is detected from the invisible light image 113, the operation permitted in the initial setting in the image capturing apparatus 100 is limited (prohibited). However, the invention is not limited thereto. For example, when the specific pattern is detected from the invisible light image 113, the system controller 102 may analyze the specific pattern and switch the mode of the image capturing apparatus 100 to a setting recommended by an operator of a venue such as a stage or a live venue.

In a stage or a live venue, there are many cases where difference in brightness between the stage and audience seats is very large and where the lighting switches abruptly, which makes the image capturing with the optimal light amount setting difficult. Also, when the stage or live venue is outdoor, the optimal light amount setting for photography vary depending on a time zone, such as daytime or evening. The optimum light amount for capturing an image can be set by photometry even in a conventional camera. However, when the lighting switches abruptly, the optimum photometry cannot always be performed for each scene.

Therefore, in a modification of this embodiment, when the pattern recognition unit 103 detects the specific pattern (YES in the step S1002), the image capturing conditions are set in accordance with the detected specific pattern as the second image capturing control process in the step S1003. Since the venue operator knows a timing at which the lighting is switched and the optimum light amount in a time zone in advance, the specific pattern including the image capturing conditions of the recommended setting can be projected with the invisible light by the projector 801 at the optimum timing.

The imaging conditions are, for example, white balance, a shutter speed, an aperture, an ISO sensitivity, recording, a photometric mode, and the like. For example, an emission timing of the lighting, an optimum photometry mode corresponding a time zone such as daytime or evening are set as the recommended setting. Alternatively, the recommended setting may be the white balance that varies depending on a scenario of a stage play or a live performance. Thus, the user can enjoy photography in different atmospheres according to the scenario.

In addition, in a case where an actor suddenly starts moving on a stage or a player starts a golf swing in a golf tournament, a combination of a plurality of set values such as an aperture, a shutter speed, and an ISO sensitivity may be set as the recommended setting. This helps to suppress blurring when an actor or a player is photographed as an object.

As described above, in the modification example of this embodiment, the setting of the image capturing apparatus 100 is automatically switched to the recommended setting that is not usually set by the user. Therefore, the user can enjoy a new image capturing experience with the setting that has been never set by the user.

If the recommended setting is projected on the screen 800 so as to be visible to the naked eye or is announced in the hall, the photographer can switch the image capturing apparatus 100 to the recommended setting. However, it is not preferable because the satisfaction of the user who is a customer is lowered. This is because, for example, if the QR code 403 is projected on the screen 800 so as to be visible to the naked eye while a movie is being played, a part of the scene is hidden by the QR code 403 and cannot be seen and the announcement of the recommended setting during the movie becomes noise.

In addition, if the setting of the image capturing apparatus 100 is frequently changed every time the process proceeds to the steps S1003 and S1004, the image capturing quality may be deteriorated. For this reason, a setting change grace period may be provided. For example, when a state in which the specific pattern is not detected from the invisible light image 113 continues for a certain period (for example, one second), the process may proceed to the step S1004.

As described above, in this embodiment, it is possible to prevent a user from erroneously capturing an image using the image capturing apparatus 100 by projecting the specific pattern with the invisible light.

In addition, in the modification example of this embodiment, since the image capturing apparatus 100 is switched to the recommended setting during the period in which the pattern recognition unit 103 continuously detects the specific pattern from the invisible light image 113, it is possible for the user to enjoy a new image capturing experience with the setting that is not usually set by the user.

During the period in which the specific pattern is continuously detected, a message indicating that the second image capturing control process is being executed in the image capturing apparatus 100, for example, a message "Currently switching to the recommended setting" may be displayed on the display unit 114. The user may be notified of the message other notification means, such as sound, light, or vibration.

A third embodiment of the present invention will now be described with appropriate reference to the drawings. In this embodiment, the visible light image 112 and the invisible light image 113 are synthesized, but when the specific pattern is detected from the invisible light image 113, these images are not synthesized.

Figure 11:
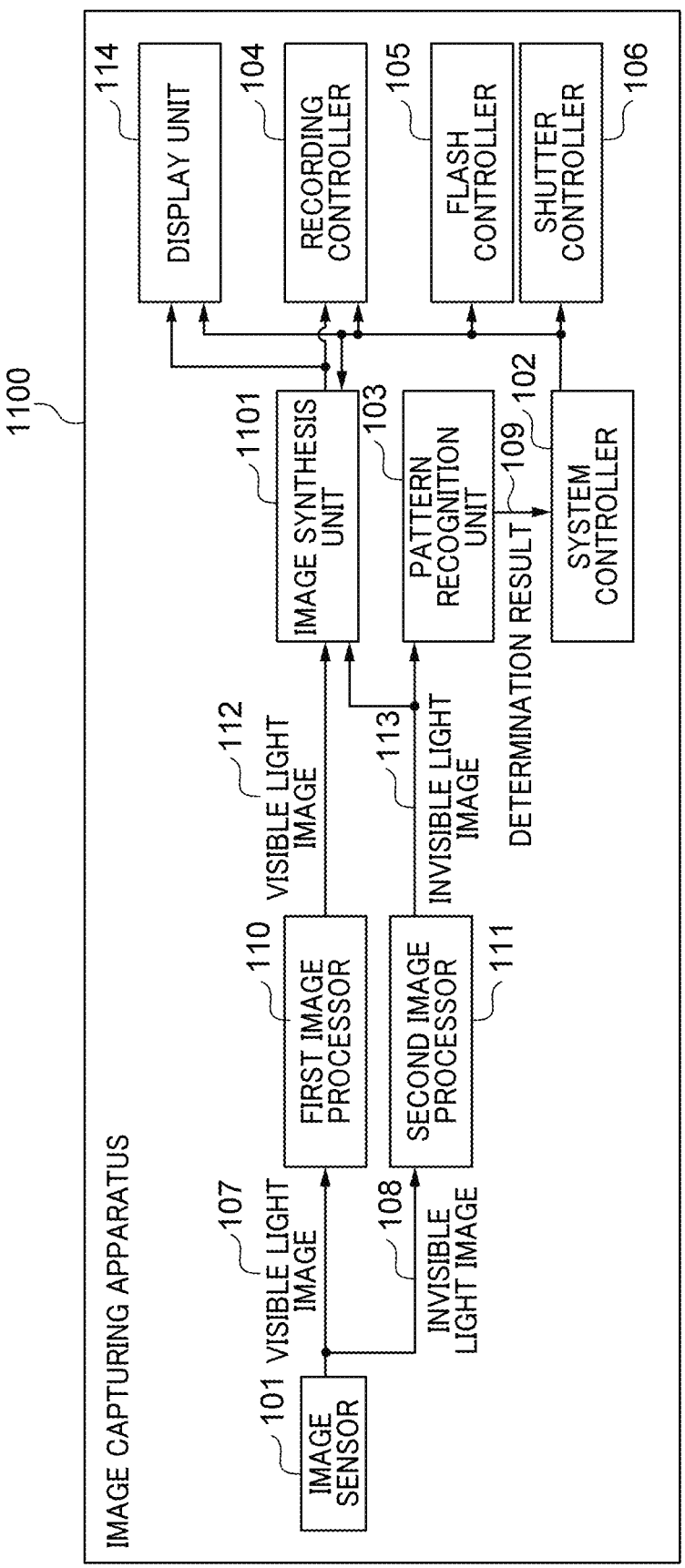
FIG. 11 is a block diagram showing a hardware configuration of an image capturing apparatus according to a third embodiment.

FIG. 11 is a block diagram showing a hardware configuration of an image capturing apparatus 1100 according to this embodiment.

A difference between the image capturing apparatus 1100 according to this embodiment and the image capturing apparatus 100 according to the first embodiment is that the image capturing apparatus 1100 includes an image synthesis unit 1101 that synthesizes the visible light image 112 and the invisible light image 113 to generate a synthetic image. It should be noted that a method of synthesizing the visible light image 112 and the invisible light image 113 by the image synthesis unit 1101 will not be described in detail because it is a known technique. For example, a method of correcting the visible light image 112 according to a level of an invisible light luminance signal obtained from the invisible light image 113 is used.

Here, as an image capturing apparatus capable of simultaneously capturing a visible light image and an invisible light image, there is a known apparatus that improves visibility in night photography by displaying a synthetic image obtained by synthesizing the visible light image and the invisible light image, for example, night imaging (see, for example, Japanese Laid-Open Patent Publication (Kokai) No. 2014-216734 (JP 2014-216734A)). In addition, a synthetic image obtained by synthesizing a visible light image and an invisible light image may be used as contrast enhancement expression.

However, in this embodiment, when the specific pattern is included in the invisible light image 113, the specific pattern is reflected in the image after the synthesis process by the image synthesis unit 1101. Therefore, in this embodiment, when the pattern recognition unit 103 detects the specific pattern from the invisible light image 113, the system controller 102 controls the image synthesis unit 1101 not to synthesize the visible light image 112 and the invisible light image 113.

As described above, in this embodiment, when the specific pattern is detected from the invisible light image 113, the visible light image 112 and the invisible light image 113 are not synthesized, and thus it is possible to prevent the specific pattern from being reflected in the synthetic image.

Figure 12:
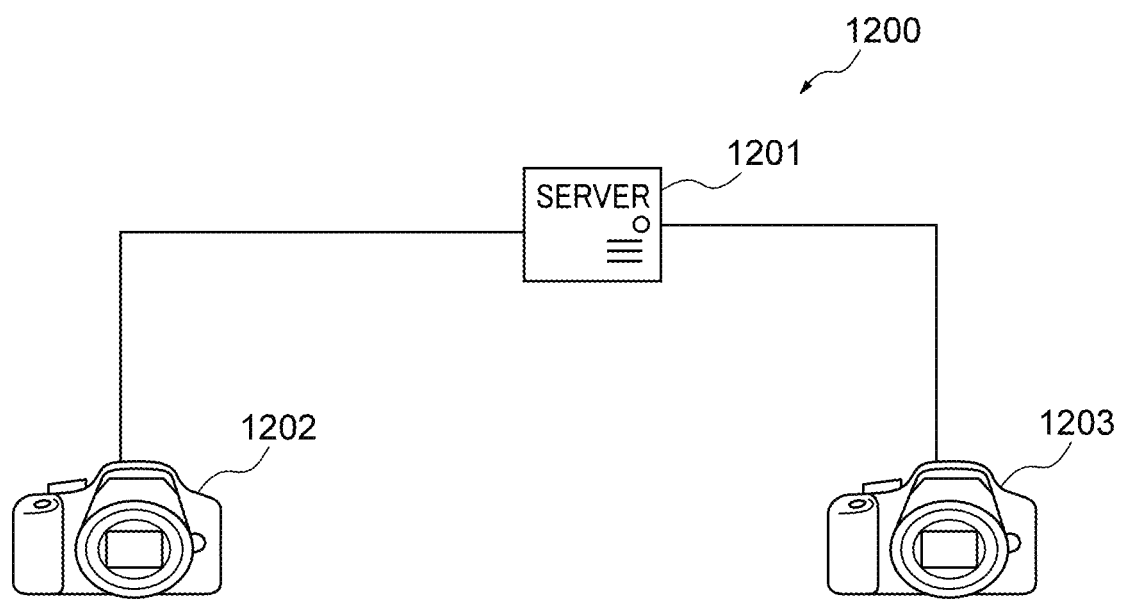
FIG. 12 is a view showing a configuration of a communication system according to a fourth embodiment.

A fourth embodiment of the present invention will now be described with appropriate reference to the drawings. In this embodiment, as shown in FIG. 12, an example of a communication system 1200 including image capturing apparatuses 1202 and 1203 and a server 1201 that links the image capturing apparatuses 1202 and 1203 will be described. It should be noted that the server 1201 may be an information processing apparatus capable of linking a plurality of image capturing apparatuses, and may be a smartphone, for example. The method of communication connection between the server 1201 and the image capturing apparatuses 1202 and 1203 is not particularly limited, and may be wireless connection or wired connection. The image capturing apparatuses that are linked by the server 1201 may be apparatuses having the same hardware described below. The number of the image capturing apparatuses is two in this embodiment, but may be three or more.

In the first embodiment, for example, when the object 501 shown in FIG. 5B comes close to the user (photographer) of the image capturing apparatus 100, the image capturing apparatus 100 automatically shifts to the flash emission prohibition mode only when the pattern recognition unit 103 can detect the QR code 403. In the meantime, the image capturing apparatus 100 may not be able to detect the QR code 403 by the pattern recognition unit 103 depending on a positional relationship such as a case where the image capturing apparatus 100 is located behind or beside the object 501. In this case, the image capturing apparatus 100 cannot automatically shift to the flash emission prohibition mode even if the live view capturing is performed near the object 501.

In this embodiment, when the QR code 403 is detected by the pattern recognition unit 103 of one of the image capturing apparatuses that are linked via the server 1201, not only the image capturing apparatus that detects the QR code 403 but also the other linked image capturing apparatuses automatically shift to the flash emission prohibition mode. As a result, in this embodiment, it is possible to solve the above-described problem occurring in the case of the first embodiment.

Figure 13:
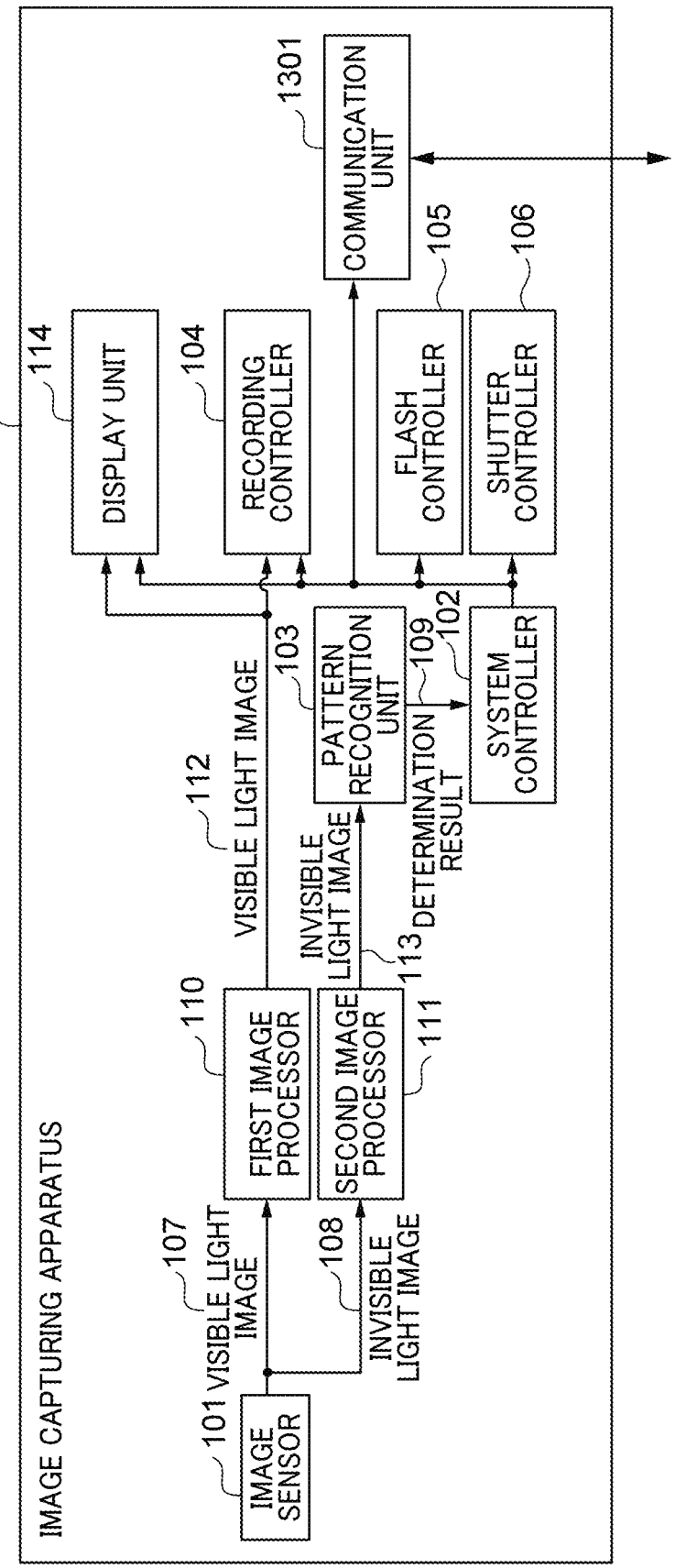
FIG. 13 is a block diagram illustrating a hardware configuration of an image capturing apparatus in FIG. 12.

FIG. 13 is a block diagram showing a hardware configuration of the image capturing apparatus 1202.

A difference between the image capturing apparatus 1202 and the image capturing apparatus 100 in the first embodiment is that the image capturing apparatus 1202 includes a communication unit 1301 for connecting to the server 1201. The image capturing apparatus 1203 is an apparatus having the same hardware configuration as that of the image capturing apparatus 1202, and thus description thereof will be omitted. The communication unit 1301 is communicable with not only the server 1201 but also with a plurality of image capturing apparatuses.

Figure 14:
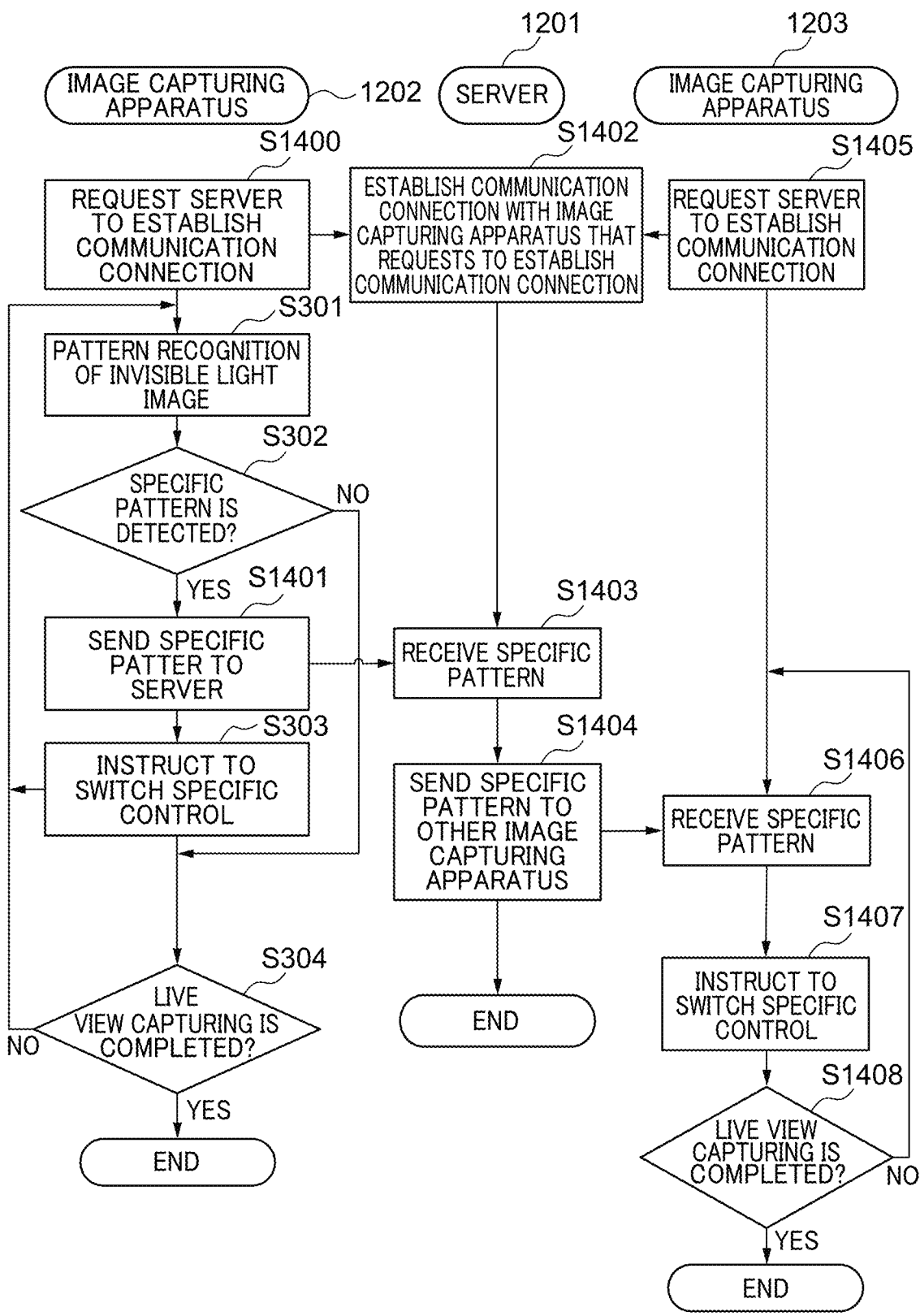
FIG. 14 is a sequence chart showing a flow of an image capturing process according to the fourth embodiment executed in a server and a plurality of image capturing apparatuses.

FIG. 14 is a sequence chart showing a flow of an image capturing process according to this embodiment executed in the server 1201 and the image capturing apparatuses 1202 and 1203. FIG. 14 shows a case where the specific pattern is detected in the image capturing apparatus 1202. However, the present invention is not limited thereto. That is, when the specific pattern is detected by one of the plurality of image capturing apparatuses that are linked via the server 1201, the detected specific pattern is transmitted to the remaining image capturing apparatuses.

There are two different points between the image capturing process (FIG. 14) according to this embodiment executed in the image capturing apparatus 1202 and the image capturing process (FIG. 3) according to the first embodiment executed in the image capturing apparatus 100. The first point is that a communication connection with the server 1201 is established in a step S1400 prior to the step S301. The second point is that a step S1401 is executed in the case of YES in step S302 prior to the step S303.

When starting this process due to the start of live view capturing, the system control unit 102 of the image capturing apparatus 1202 requests the server 1201 to establish communication connection in the step S1400 and establishes communication connection with the server 1201. Thereafter, the process proceeds to the step S301.

In the step S1401, the system control unit 102 of the image capturing apparatus 1202 sends the specific pattern detected in the step S302 to the server 1201 using the communication unit 1301. Thereafter, the process proceeds to the step S303

The process of the server 1201 in FIG. 14 will now be described. In the server 1201, a CPU (not shown) reads various programs stored in a storage unit (not shown) and executes this process in accordance with the read programs.

First, in a step S1402, the server 1201 establishes the communication connections with the image capturing apparatuses that have requested establishment of the communication connections (the image capturing apparatuses 1202 and 1203 in the example in FIG. 14). As a result, link between the plurality of image capturing apparatuses (the image capturing apparatuses 1202 and 1203 in the example in FIG. 14) via the server 1201 is started.

Next, when the server 1201 receives the specific pattern in a step S1403 from any of the image capturing apparatuses (the image capturing apparatus 1202 in the example in FIG. 14) with which the communication connection is established in the step S1402, the process proceeds to a step S1404.

In the step S1404, the specific pattern received in the step S1403 is sent to the other image capturing apparatus (the image capturing apparatus 1203 in the example in FIG. 14) other than the sending source of the specific pattern in the step S1403 among the image capturing apparatuses with which the communication connections are established in the step S1402. Thereafter, this process is terminated.

Next, the process of the image capturing apparatus 1203 in FIG. 14 will be described. This process starts when a power button (not shown) of the image capturing apparatus 1203 is turned ON and what is called live view capturing starts. This process is achieved by the system controller 102 of the image capturing apparatus 1203 executing a control program to control the respective sections of the image capturing apparatus 1203.

First, the image capturing apparatus 1203 requests the server 1201 to establish a communication connection in a step S1405 and establishes the communication connection with the server 1201.

Next, when the specific pattern is received from the server 1201 in a step S1406, the process proceeds to a step S1407.

The specific pattern received from the server 1201 in the step S1406 is analyzed in the step S1407 and switching of the specific control is instructed in accordance with the analysis result. And then, the process proceeds to a step S1408.

In the step S1408, it is determined whether the live view capturing is completed after switching the specific control in accordance with the instruction in the step S1407. When it is completed (YES in the step S1408), the main image capturing process is ended. When it is not completed (NO in the step S1408), the process returns to the step S1406.

As described above, according to this embodiment, when the pattern recognition unit 103 of the image capturing apparatus (1202) among the plurality of image capturing apparatuses linked via the server 1201 detects the specific pattern, the specific pattern is sent to the other linked image capturing apparatus (1203). When the specific pattern is sent from the server 1201, the linked image capturing apparatus analyzes the specific pattern and instructs switching of the specific control in accordance with the analysis result, as with a case where the specific pattern is detected by the pattern recognition unit 103 of itself.

As described above, according to this embodiment, when the specific pattern on the seal attached to the clothes of the object 501 can be detected by one of the image capturing apparatuses linking via the server 1201, all the image capturing apparatuses can switch the specific control.

It should be noted that the configuration is not limited to the configuration of this embodiment as long as such an effect is achieved. For example, although the pattern recognition unit 103 is provided in each of the image capturing apparatuses 1202 and 1203 in this embodiment, the pattern recognition unit 103 may be provided in the server 1201 instead of the image capturing apparatuses 1202 and 1203. In this case, all the linked image capturing apparatuses (here, the image capturing apparatuses 1202 and 1203) send the invisible light images 113 to the server 1201. When the pattern recognition unit 103 of the server 1201 detects the specific pattern from the invisible light image 113 received from one of the linked image capturing apparatuses, the CPU generates a specific control switching instruction. Thereafter, the CPU (an instruction sending unit) sends the generated specific control switching instruction to all the linked image capturing apparatuses. All the linked image capturing apparatuses automatically switch the specific control in response to the specific control switching instruction received from the server 1201.

In addition, in this embodiment, the specific control switching instruction may be an instruction to set an image capturing timing to a timing at which the object comes to the front. In this case, when the specific control switching instruction is issued, all the linked image capturing apparatuses capture an image of the object 501 when detecting that the image capturing apparatuses are located at a position facing the object 501 using the visible light image 112 or the invisible light image 113.

Alternatively, the specific control may be switched by direct communication between the image capturing apparatuses (1202 and 1203) without using the server 1201. In this case, for example, when the specific pattern is detected by one image capturing apparatus (1202), the image capturing apparatus (1202) sends the specific pattern to the other image capturing apparatus (1203) via the communication unit. When the other image capturing apparatus (1203) receives the specific pattern by the own communication unit, it performs the same process as that in the case where the specific pattern is detected by the own pattern recognition unit 103. That is, the other image capturing apparatus (1203) analyzes the specific pattern sent from the image capturing apparatus (1202) and issues the specific control switching instruction according to the analysis result. The image capturing apparatus may be an apparatus having the same hardware described above. Although the number of the image capturing apparatuses is two in the above description, it may be three or more. It should be noted that the image capturing apparatus that receives the specific pattern and the reception range thereof may be set in advance in the image capturing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091083, filed Jun. 3, 2022, which is hereby incorporated by reference herein in its entirety.

What is claimed is:

1. An image capturing apparatus comprising:
an image sensor that includes a photoelectric conversion section including first type pixels that receive visible light from a light flux from an object and output a visible light image and second type pixels that receive invisible light from the light flux from the object and output an invisible light image;
a memory device that stores a set of instructions; and
at least one processor that executes the set of instructions to:
perform pattern recognition of the invisible light image; and
switch an image capturing control for capturing the visible light image from a first image capturing control to a second image capturing control in a case where a specific pattern is detected from the invisible light image through the pattern recognition.

2. The image capturing apparatus according to claim 1, wherein the invisible light is at least one of near-infrared light, mid-infrared light, far-infrared light, and ultraviolet light.

3. The image capturing apparatus according to claim 1, wherein the at least one processor executes instructions in the memory device to:
perform the second image capturing control in a period in which the specific pattern is recognized through the pattern recognition, and
perform the first imaging control in a period in which the specific pattern is not recognized through the pattern recognition.

4. The image capturing apparatus according to claim 1, wherein the at least one processor executes instructions in the memory device to control light emission of a flash emission unit that illuminates the object,
wherein the first image capturing control permits light emission from the flash emission unit, and the second image capturing control prohibits light emission from the flash emission unit.

5. The image capturing apparatus according to claim 1, wherein the at least one processor executes instructions in the memory device to control a mechanical shutter and an electronic shutter used when capturing an image, and
wherein the first image capturing control permits use of the mechanical shutter, and the second image capturing control prohibits use of the mechanical shutter and permits use of only the electronic shutter.

6. The image capturing apparatus according to claim 1, wherein the at least one processor executes instructions in the memory device to control recording of the visible light image,
wherein the first image capturing control permits the recording of the visible light image, and the second image capturing control prohibits the recording of the visible light image.

7. The image capturing apparatus according to claim 1, wherein the first image capturing control permits setting of an image capturing condition designated by a user, and the second image capturing control sets the image capturing condition corresponding to the specific pattern.

8. The image capturing apparatus according to claim 7, wherein the image capturing condition includes at least one of white balance, shutter speed, aperture, ISO sensitivity, recording, and a photometric mode.

9. The image capturing apparatus according to claim 1, wherein the at least one processor executes instructions in the memory device to perform notification to notify a user that the second image capturing control is performing in a case where the specific pattern is detected from the invisible light image through the pattern recognition.

10. The image capturing apparatus according to claim 1, wherein the at least one processor executes instructions in the memory device to return the image capturing control from the second image capturing control to the first image capturing control in a case where the specific pattern is no longer detected from the invisible light image through the pattern recognition.

11. The image capturing apparatus according to claim 10, wherein the at least one processor executes instructions in the memory device to return the image capturing control from the second image capturing control to the first image capturing control in a case where a state in which the specific pattern is not detected from the invisible light image continues for a certain period through the pattern recognition.

12. The image capturing apparatus according to claim 1, wherein the specific pattern detected from the invisible light image through the pattern recognition is sent to another linked image capturing apparatus that has the at least one processor.

13. The image capturing apparatus according to claim 12, wherein the other image capturing apparatus is linked via an information processing apparatus.

14. An information processing apparatus that links a plurality of image capturing apparatuses, the information processing apparatus comprising:
a memory device that stores a set of instructions; and
at least one processor that executes the set of instructions to:
perform pattern recognition of an invisible light image in a case where the invisible light image generated from invisible light in a light flux from an object is received from one of the plurality of image capturing apparatuses; and
send a switching instruction to the plurality of image capturing apparatuses so as to switch an image capturing control of each of the plurality of image capturing apparatuses from a first image capturing control to a second image capturing control in a case where a specific pattern is detected from the received invisible light image through the pattern recognition.

15. A control method for an image capturing apparatus that includes an image sensor including a photoelectric conversion section including first type pixels that receive visible light from a light flux from an object and output a visible light image and second type pixels that receive invisible light from the light flux from the object and output an invisible light image, the control method comprising:
performing pattern recognition of the invisible light image; and
switching an image capturing control for capturing the visible light image from a first image capturing control to a second image capturing control in a case where a specific pattern is detected from the invisible light image through the pattern recognition.

16. A control method for an information processing apparatus that links a plurality of image capturing apparatuses, the control method comprising:
performing pattern recognition of an invisible light image in a case where the invisible light image generated from invisible light in a light flux from an object is received from one of the plurality of image capturing apparatuses; and
sending a switching instruction to the plurality of image capturing apparatuses so as to switch an image capturing control of each of the plurality of image capturing apparatuses from a first image capturing control to a second image capturing control in a case where a specific pattern is detected from the received invisible light image through the pattern recognition.

17. A non-transitory computer-readable storage medium storing a control program causing a computer to execute a control method for an image capturing apparatus that includes an image sensor including a photoelectric conversion section including first type pixels that receive visible light from a light flux from an object and output a visible light image and second type pixels that receive invisible light from the light flux from the object and output an invisible light image, the control method comprising:
performing pattern recognition of the invisible light image; and
switching an image capturing control for capturing the visible light image from a first image capturing control to a second image capturing control in a case where a specific pattern is detected from the invisible light image through the pattern recognition.

18. A non-transitory computer-readable storage medium storing a control program causing a computer to execute a control method for an information processing apparatus that links a plurality of image capturing apparatuses, the control method comprising:
performing pattern recognition of an invisible light image in a case where the invisible light image generated from invisible light in a light flux from an object is received from one of the plurality of image capturing apparatuses; and
sending a switching instruction to the plurality of image capturing apparatuses so as to switch an image capturing control of each of the plurality of image capturing apparatuses from a first image capturing control to a second image capturing control in a case where a specific pattern is detected from the received invisible light image through the pattern recognition.

* * * * *